United States Patent [19]

Fraker et al.

[11] Patent Number: 5,089,895
[45] Date of Patent: Feb. 18, 1992

[54] ENCAPSULATED TELEVISION CAMERA AND METHOD AND APPARATUS FOR FABRICATING SAME

[75] Inventors: Winford C. Fraker; Frank W. Gilleland, both of Orlando, Fla.

[73] Assignee: Cues, Inc., Orlando, Fla.

[21] Appl. No.: 519,474

[22] Filed: May 7, 1990

[51] Int. Cl.$^5$ .................. H04N 5/30; H04N 7/18; B29B 13/00

[52] U.S. Cl. ............................ 358/229; 358/99; 358/100; 73/40.5 R; 264/46.6; 264/271.1

[58] Field of Search ............ 358/229, 210, 209, 101, 358/100, 108, 93, 99, 98; 264/271.1, 279.1, 331.19; 425/4 R, 817 R, 116, 117; 354/64; 73/40.5 R

[56] References Cited

U.S. PATENT DOCUMENTS

| | | | |
|---|---|---|---|
| Re. 33,160 | 2/1990 | Guthrie et al. | 73/40.5 R |
| 2,971,259 | 2/1961 | Hahnau et al. | 358/100 |
| 4,651,558 | 3/1987 | Martin et al. | 73/40.5 |
| 4,768,678 | 9/1988 | Nusbaumer et al. | 220/444 |
| 4,882,600 | 11/1989 | Van de Moere | 354/64 |
| 4,905,670 | 3/1990 | Adair | 128/18 |

FOREIGN PATENT DOCUMENTS 0137227  10/1979  Japan .................................... 358/99

*Primary Examiner*—James J. Groody
*Assistant Examiner*—Safet Metjahic
*Attorney, Agent, or Firm*—Epstein, Edell & Retzer

[57] ABSTRACT

A television camera is encapsulated in plastic material providing protection from environmental hazards. The camera, including a camera body, lens and lens cover glued to the lens, is embedded in and chemically bonded to the encapsulate material. A lens opening in the forward end of the encapsulate housing exposes the lens cover. A camera cable and pushrod extend from the rearward end of the housing and are chemically bonded to the encapsulate material. Individual light sources, partially embedded in the encapsulate material, are disposed in respective recesses oriented in an annular pattern about the lens opening. The encapsulation process employs a mold assembly having a base with a raised pedestal on which the lens cover is placed to support the camera. Multiple lamp receivers are disposed in the base in an annular pattern about the pedestal to sealingly receive the forward portions of respective lamps while leaving the remaining rearward portions exposed. At least one additional mold section mates with the base to provide an enclosure having a single opening at its top through which flowable encapsulate material may be poured.

26 Claims, 2 Drawing Sheets

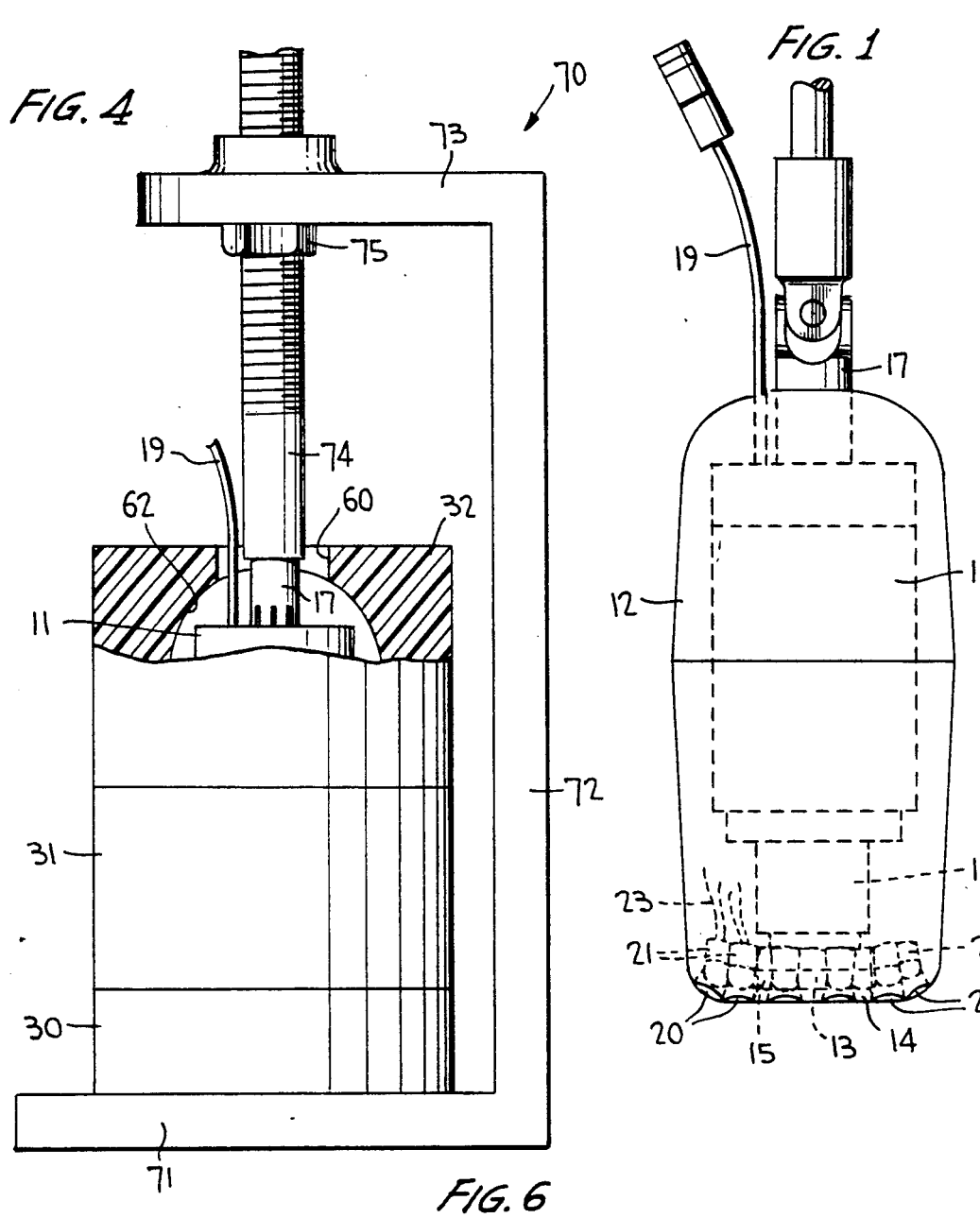
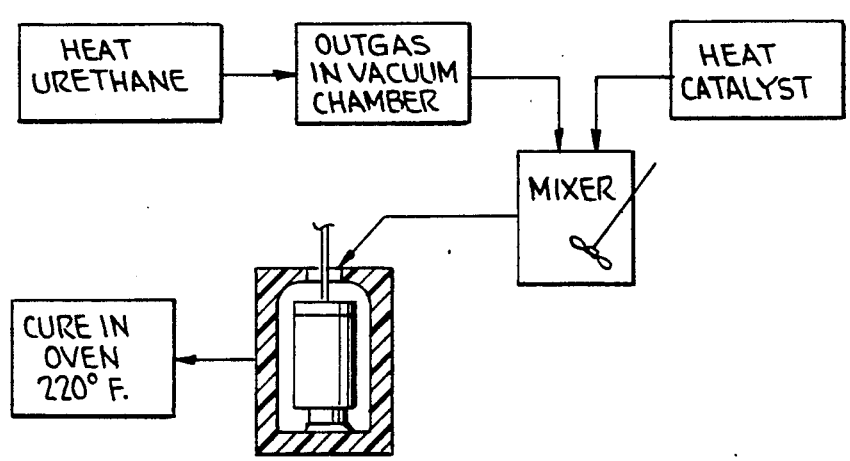

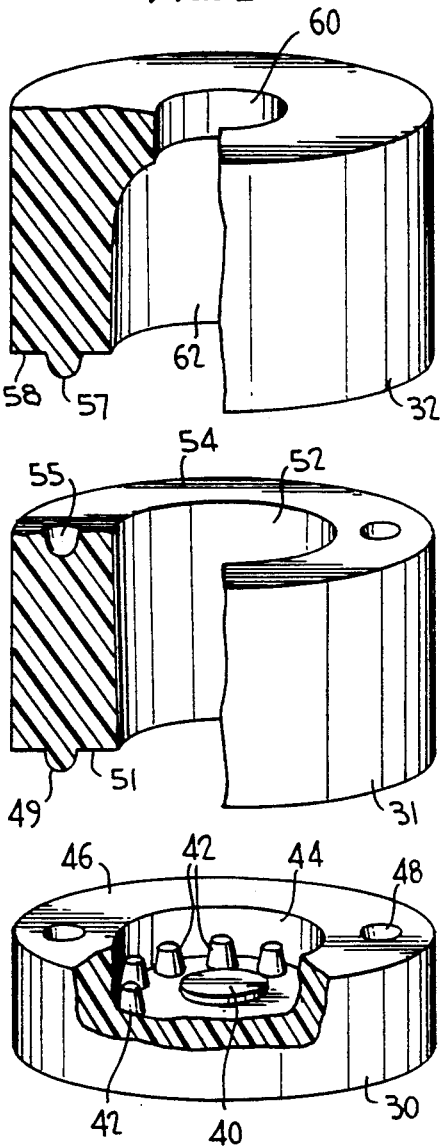
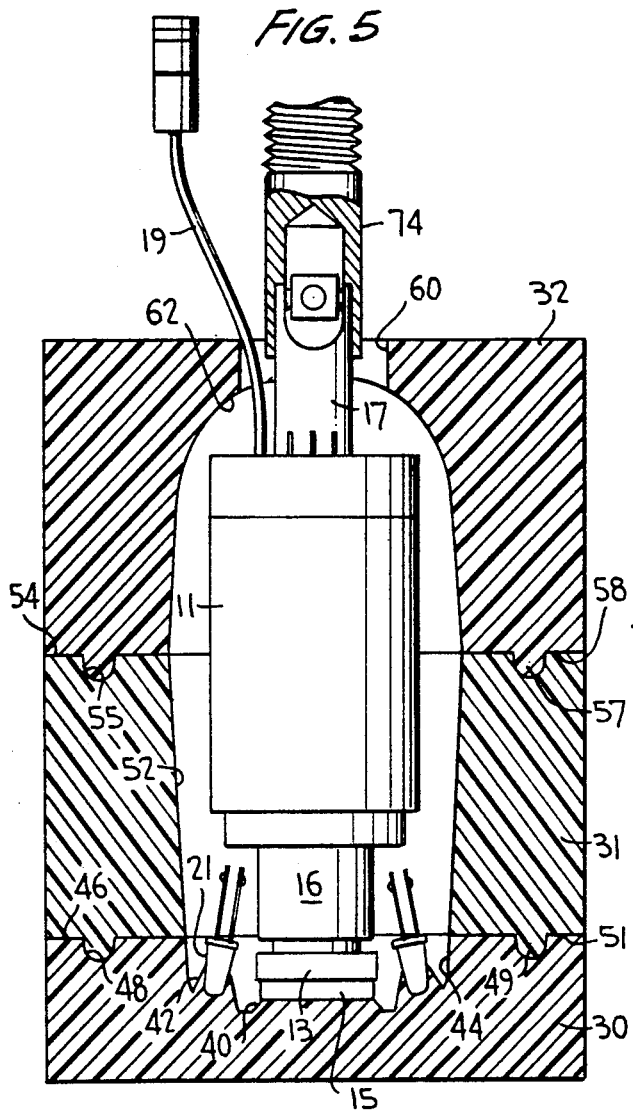
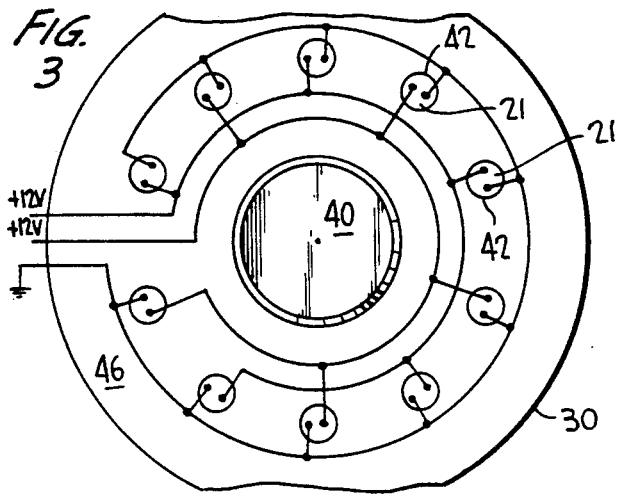

ENCAPSULATED TELEVISION CAMERA AND METHOD AND APPARATUS FOR FABRICATING SAME

BACKGROUND OF THE INVENTION

1. Technical Field

The present invention relates generally to television camera housings. More particularly, the present invention relates to television cameras embedded or encapsulated in plastic housings, and to methods and apparatus for encapsulating a television camera. The invention has particular utility for television cameras employed for pipeline inspection, and the preferred embodiment described herein is intended for that purpose. However, it is to be understood that the present invention has far broader utility, namely television cameras employed in security systems, nuclear systems, explosive environments, underwater environments and other hostile environments wherein the camera is typically subjected to shock, pressure, chemical and other environmental hazards.

2. Discussion of the Prior Art

Conventional television cameras designed for use in hostile environments are typically housed in sealed metal or plastic containers that are expensive in both material cost and assembly time. Moreover, although the housings for such prior art cameras may be adequate to serve as waterproof containers, the housed camera is generally not protected adequately against shock, certain chemical environments, etc. In addition, pressure sealed television camera housings tend to be too bulky and heavy to permit efficient use of the camera for security applications and the like.

OBJECTS AND SUMMARY OF THE INVENTION

It is therefore an object of the present invention to provide a television camera housing that protects the television camera against damage in substantially any hostile environment.

A further object of the present invention is to provide a television camera embedded or encapsulated in a plastic housing that chemically bonds to the camera components to protect them against damage from liquids, pressure, shock, chemicals and other hazards and yet is sufficiently small to permit use of the camera in minimum space environments.

Another object of the present invention is to provide an inexpensive method and apparatus for encapsulating a television camera in a plastic material.

In accordance with the present invention, a small television camera, preferably of the charge-coupled device (CCD) type, is embedded or encapsulated in a plastic housing material. The housing has a lens opening exposing a transparent protective lens cover secured to the front surface of the camera lens by means of adhesive material that prevents water and other environmental fluids, as well as flowable encapsulate material during molding, from reaching the lens. The electrical cable for the camera, and possibly a pushrod for moving the camera and housing, project rearwardly from the encapsulate material housing. In a preferred embodiment, a plurality of auxiliary recesses are disposed in the housing in an annular pattern about the lens opening to receive respective light sources for illuminating the camera field of view. Portions of the light sources are embedded in and chemically bonded to the encapsulate material along with the wiring for the light sources, the wiring extending out from the housing via the camera cable.

In fabricating the housing, a mold base is placed in a fixture. If the camera is to have self-contained illumination sources, individual lamps are placed in respective female recesses in the mold base and wired as required. The camera, with the lens cover glued in place, is prefocused and placed in the mold base with the lens cover facing downward and resting on a raised pedestal that ultimately defines the lens opening in the housing. The rearward end of the camera is supported in the fixture by a hollow cylindrical support rod about which intermediate and top annular mold parts are disposed for subsequent deployment. Wires from the light sources and camera are appropriately connected and grouped to extend as a cable from the rearward end of the camera and then through a central aperture in the closed end of the top mold part. The internal and top mold parts are then lowered about the camera, and the support rod is forced downwardly to the extent necessary to urge the camera lens against the pedestal in the mold base in sealing abutment. The plastic encapsulate material is prepared and then poured through the annular passage defined between the aperture in the top mold part and the cylindrical support rod of the fixture. The poured encapsulate material is permitted to cool in place before the mold is removed from the fixture for curing, after which the molded assembly is removed.

A unique feature of the described molding apparatus and method is that the mold itself supports all of the encapsulated components in proper mutual orientation without requiring separate support members. Accordingly, the hardened encapsulate material holds all the components in place in the final product.

In addition, the encapsulate material chemically bonds to the periphery of the lens cover, the cable, and the pushrod in order to assure a complete seal for the internally housed components of the camera.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a front view in elevation of the encapsulated television camera of the present invention;

FIG. 2 is an exploded view in perspective of a three-part mold assembly employed in fabricating the camera of FIG. 1 pursuant to the present invention;

FIG. 3 is a top view in plan of the base of the mold illustrated in FIG. 2;

FIG. 4 is a front view in elevation of the television camera of FIG. 1 and the mold assembly of FIG. 2 disposed in a mixture as part of the encapsulation process of the present invention;

FIG. 5 is an enlarged elevational view in section of the television camera of FIG. 1 disposed in the three-part mold assembly of FIG. 2 as part of the encapsulation process of the present invention; and FIG. 6 is a functional block diagram illustrating part of the method of encapsulating a television camera according to the present invention.

DESCRIPTION OF THE PREFERRED EMBODIMENTS

Referring specifically to FIG. 1 of the accompanying drawings, a television camera assembly 10 includes a solid, generally cylindrical housing 12 of encapsulate material filling all of the interior space surrounding the camera components. The encapsulate material is any plastic material suitable for the purpose, such as urethane, silicone, polystyrene, etc., and in the preferred embodiment is Andure 9000 urethane manufactured by the Anderson Development Company of Adrin, Michigan. Embedded within the encapsulate material 12 is a CCD television camera having a body portion 11 with a lens 13 secured at its forward end by means of an intermediately disposed lens-to-camera adapter 16. By way of example, the camera may be a model WAT-902 manufactured by the Watec Company of Kawasaki City, Japan; however, various other small television cameras may alternatively be employed in accordance with the present invention and as determined by the intended end use for the overall assembly. A transparent lens cover 15 is secured to the front face of lens 13 by means of glue or other adhesive material applied in an annular pattern on the interior surface of the lens cover adjacent its outer edge. The glue or adhesive material may, for example, be Super Bonder 495 manufactured by Loctite Corporation. Lens cover 15 is configured to cover the entire front surface of lens 13 and is typically made of transparent scratch-resistant glass or plastic having structural, thermal and chemical properties consistent with the environment in which the camera assembly is intended to function. The front surface of lens cover 15 is exposed to the ambient environment through a recessed lens opening 14 at the front end of housing 12. The encapsulate housing material 12 is chemically bonded to the peripheral edge of the lens cover to assure a proper fluid pressure seal at lens opening 14 for the interiorally encapsulated camera components.

A pushrod 17 is fixedly secured to the rearward end of camera body 11 and serves to permit the camera assembly 10 to be pushed or pulled through a pipeline, or the like, by forces applied longitudinally of the pushrod. It will be appreciated that the pushrod may be eliminated for camera assemblies that do not require a means for translating the assembly longitudinally when the assembly is in use. An electric cable 19 carries electrical wires for the camera assembly to a remote location and extends from the rearward end of the camera body 11 alongside the pushrod. Both cable 19 and pushrod 17 project rearwardly out from the housing and are chemically bonded to the encapsulate material 12 to assure a proper seal at their egress locations.

Multiple small frusto-conical auxiliary recesses 20 are defined in the forward end of housing 12 in an annular pattern surrounding and spaced from the recessed lens opening 14. Each auxiliary recess 20 tapers inwardly and contains a respective light source 21 embodied as a light emitting diode (LED), an incandescent lamp, or other suitable illumination source. Electrical terminals for the light sources are embedded in the encapsulate housing 12 as are the rearward portions of the light sources and the electrical wiring 23 between the light source terminals and the rearward end of camera body 11. In the preferred embodiment there are ten light sources 21 arranged in a ring about lens cover 15. It will be appreciated that, for many television camera applications, there may be no need for self-contained light sources; in such cases, the camera assembly is fabricated without recesses 20, light sources 21 and the associated wiring.

The method and apparatus for fabricating an encapsulated camera according to the present invention is illustrated in FIGS. 2 through 5 to which specific reference is now made. A mold assembly includes a base 30, an intermediate section 31 and a top section 32. The mold assembly may alternatively utilize only two sections (or, for that matter, more than three sections) as required by the ultimate camera assembly configuration. The mold sections may be made of any suitable plastic or metal material consistent with the encapsulate material to be poured and hardened therein. Mold base 30 is generally cup-shaped and has a centrally disposed raised circular pedestal 40 defined in its interior bottom surface. The pedestal is configured to form the lens opening 14 of the camera housing 12. Specifically, the diameter of pedestal 40 at its top is slightly smaller than the diameter of lens cover 15. The sidewall of the pedestal is tapered slightly to provide an overall solid frusto-conical configuration to facilitate removal of the molded camera assembly from mold base 30 after the encapsulate material has been cured. From the base of pedestal 40, the interior surface of the bottom wall of the base extends radially outward a short distance before becoming upwardly arcuate to merge with the upstanding peripheral wall 44 of the base. In this curved or arcuate region there is provided a plurality of upstanding lamp receivers 42 of hollow frusto-conical configuration, open at their upper ends. The interior of each lamp receiver 42 is configured to engage a respective lamp 21. In this regard, the sidewall of lamp receiver 42 is preferably thin and flexible enough, at least at its upper end, to resiliently engage each lamp 42 and thereby provide a sufficient seal to prevent flowable encapsulate material from entering the receiver. The thickness of this sidewall increases gradually toward the bottom of the receiver to provide the frustoconical configuration for recess 20 in the final camera assembly. Lamp receivers 42 are equally spaced from pedestal 40 to define an annular pattern of receivers about the pedestal. Likewise, lamp receivers 42 are disposed at equal angular intervals, and ten receivers are provided in the disclosed embodiment. It will be appreciated that the number, orientation and shape of lamp receivers 42 depend on the requirements for the self-contained illumination source in any given camera assembly.

The upraised interior wall 44 of mold base 30 flares slightly outward at an angle on the order of two degrees to facilitate removal of the final molded product from the mold base. The upward-facing annular edge 46 of mold base 30 is provided with a plurality of recesses 48 spaced and configured to receive corresponding protrusions 49 from the downward-facing annular edge 50 of intermediate mold section 31, thereby assuring proper registry between intermediate section 31 and base 30 when the mold is assembled. Intermediate mold section 31 is generally annular with an interior wall 52 contoured to provide a continuation of the flared interior wall 44 of mold base 30, thereby assuring easy removal of the final molded product from mold section 31.

The upward-facing annular edge 54 of intermediate mold section 31 is provided with a plurality of spaced recesses 55 configured and positioned to receive corresponding projections 57 from downward-facing annular edge 58 of the top mold section 32, thereby assuring that the mold sections 31 and 32 are in proper registration when the mold is assembled.

Top mold section 32 has an inverted cup-like configuration, open at its bottom, with a central aperture 60 defined through its top wall. The interior wall surface 62 of top mold section 32 has a diameter at its lower end substantially equal to the diameter of the interior wall 52 of intermediate mold section 31 at its upper end. However, the internal diameter of top section 32 tapers or reduces gradually, at an angle of approximately three degrees, to facilitate separation of top mold section 32 from the final molded product. At the upper end of top mold section 32, the interior wall 62 becomes arcuate to provide a rounded end for the final molded product. Aperture 60 has a diameter somewhat larger than the diameter of pushrod 17 so as to accommodate cable 19 passing therethrough and to provide an annular opening about the pushrod through which flowable encapsulate material can be poured into the assembled mold.

The mold assembly is employed in conjunction with a fixture 70 having a bottom or platform 71, an upstanding rear wall 72 and a top wall 73 extending parallel to the platform 71 and spaced therefrom by a distance corresponding to the height of the rear wall 72. That height exceeds the height of the assembled mold section 30, 31 and 32 by an amount sufficient to permit the steps described below to be performed. Top wall 73 has an aperture defined therethrough in alignment with the substantial center of platform 71. A hollow fixture rod 74 retained in the top wall aperture and is engaged by a tensioning nut 75 to permit selective longitudinal displacement of the rod. The fixture of is configured at its lower end to frictionally (or otherwise) engage the pushrod 17 or other suitable projection from the camera body to thereby hold the camera in place in the mold assembly. Annularly abutting shoulders of the pushrod and fixture rod (see FIG. 5) permit the fixture rod to apply downwardly directed forces to the camera unit, as necessary.

The procedure for fabricating the encapsulated camera assembly begins with placement of mold base 30 on platform 71 of fixture 70. If the camera is to be provided with self-contained illumination, lamps 21 are inserted in respective lamp recesses 42 as best illustrated in FIG. 3. Lamps 21 may be individually inserted into respective receivers 42 and then electrically interconnected by appropriate wiring, as shown. Alternatively, the lamps may be pre-mounted and pre-wired on an annular circuit board and then inserted into the receivers 42 as a unit. The central opening in such a circuit board would necessarily be large enough to accommodate the camera body 11 therein. In either case, once the lamps are inserted and wired, the camera assembly may be positioned in mold base 30. Prior to this, the camera is tested and pre-focused as desired. In addition, lens cover 15 is secured over lens 13 in the manner described above and, if necessary, tape may be placed over the exposed lens cover surface to prevent encapsulate material from adhering thereto should any such material migrate between the lens cover and pedestal 40 during the molding process. The camera, including camera body 11, adapter 16, lens 13 and lens cover 15, is then secured to fixture rod 74 at pushrod 17. This may be done with the intermediate mold section 31 and top mold section 32 already disposed about the camera body 11; alternatively, mold sections 31 and 32 may be supported on the fixture about rod 74 prior to insertion of the camera, body into the fixture. By lowering fixture rod 74, the camera can be positioned in mold base 30 with lens cover 15 positioned on pedestal 40. Wiring for lamps 21, if they are present, is threaded through the mold sections to the rearward end of the camera body 11. Electrical cable 19 is brought out through aperture 60 in the top mold section along-side pushrod 17. Once the camera is properly positioned, the mold sections 31 and 32 can be lowered to enclose the camera unit.

The urethane or other encapsulate material is then prepared for pouring. As illustrated in FIG. 6, the urethane is heated to render it flowable, typically to a temperature of approximately 220° F. The flowable urethane is then placed in a vacuum chamber where it is outgassed to remove any air bubbles. An appropriate catalyst or curative is then heated to approximately 140° F. and mixed with the flowable urethane. The mixture can then be poured through aperture 60 at the top of the mold assembly to fill the entire mold cavity surrounding the camera components. Once the poured encapsulate has cooled, the mold assembly is placed in an oven and cured at a temperature of approximately 220° F. for approximately sixteen hours to increase the speed of polymer crosslinking. Thereafter, the mold parts may be removed from the final assembled camera unit.

As an alternative to pouring the encapsulate mixture through aperture 60, the mixture may be injected under pressure with a syringe, or the like, through a suitably provided injection port communicating with the lower part of the mold interior through mold base 30. This injection technique is less likely to entrap air bubbles in the encapsulate material. In addition, pressure molding and injection molding techniques are possible alternatives to the method described.

For some applications it may be possible to eliminate the lens cover, particularly where the camera assembly is not intended for use in an environment that will adversely affect the exposed lens 13. Under such circumstances, tape or the like, would be placed over the lens 13 which would be positioned directly on pedestal 40 during the molding process.

Cable 19 carries supply voltages, ground lines and the video signal line to permit remote viewing of the image received by the television camera. Typically, the various connections for the cable are made at the rear of the camera body, although for some applications, depending upon the camera type, it is conceivable that cable 19 may extend from a different location of the housing. Under any circumstances, the encapsulate material chemically bonds to the cable exterior within the housing.

The encapsulated camera as described herein provides a rugged assembly wherein the camera components are effectively sealed against hostile ambient conditions, whether those conditions be water, pressure, dust, shock or chemical in nature. The camera components are suspended in the encapsulate material, and the mold serves to support all elements in proper position relative to one another without requiring separate support members that must remain within the camera housing or be removed so that a hole remains in the housing that must be separately filled with a plug, or the like. The encapsulate material chemically bonds to the internal components and fills all voids within the housing, whereby the internal camera components are entirely surrounded by a solid mass of encapsulate material.

The present invention is not limited by the size or shape of the final camera assembly, although the invention has particular utilization for a small camera, particularly a CCD-type camera. For the preferred embodiment described above, the following dimensions are presented by way of example only: length of assembly between front and rear of housing 12, 4 inches; diameter of housing 12 at its widest point (i.e., intermediate the tapered sections), 1.875 inches; radius of curvature of housing 12 at rearward end, 0.75 inches; diameter of lens opening 14 in housing, 0.68 inches; longitudinal distance between front end of housing and point of maximum housing diameter, 2.160 inches; taper angle for auxiliary recesses 42, 30°; tilt of major axis of frusto-conical auxiliary recesses 42 relative to longitudinal axis of housing, 9°; spacing between axes of diametrically opposed auxiliary recesses 20, 1.354 inches; depth of auxiliary recesses 20 (on axis), 0.27 inches; depth of lens opening 14 in housing 12, 0.062 inches.

There are numerous advantages to the encapsulate housing of the present invention. Among these advantages is that the cost of the housing is relatively low since the inexpensive urethane or other encapsulate material replaces a number of machined stainless steel pieces conventionally employed for sealed camera housings. The urethane elastomer serves as a shock material to protect the interior components from damage. In addition, the urethane is highly resistive to abrasion and holds up to the rigors of most applications in hostile environments much better than metal enclosures.

For cameras employed in security applications, the protection afforded by the encapsulate material renders the camera substantially vandal-proof. For such applications, the electrical cable may be encased in a stainless steel tube of the type employed for pay telephones to thereby render it virtually impossible for someone to sever the electrical connections to the camera.

The present invention also permits fabrication of a buoyant camera capable of floating, if desired. This would render it possible to float the camera in a controlled water flow to a downstream location (e.g., in a pipeline), terminate the flow, and pull the camera back while performing inspection. A buoyant camera can be fabricated by using RIM, or resin injection molding, for the encapsulated housing. The RIM process provides a solid film on the outside surface and a foam material interior, thereby permitting an increase in the buoyancy of the final product so as to permit it to float.

From the foregoing description it will be appreciated that the invention makes available a novel camera assembly, a method for fabricating that camera assembly and apparatus for performing that method, wherein a rugged camera is the resulting end product and is capable of withstanding substantially any hazard in a hostile environment.

Having described preferred embodiments of a new encapsulated television camera and method and apparatus for fabricating the camera, it is believed that other modifications, variations and changes will be suggested to those skilled in the art in view of the teachings set forth herein. It is therefore to be understood that all such variations, modifications and changes likely fall within the scope of the present invention as defined by the appended claims.

What is claimed is:

1. An encapsulated television camera assembly comprising:
   a television camera body having a forward end and a rearward end;
   a television camera lens secured to said camera body at said forward end;
   an electric cable secured to and extending from said body for carrying power supply and video signals between said camera body and a remote location; and
   a housing comprising a solid mass of molded plastic encapsulate material surrounding said camera body, said housing having a viewing opening exposing said forward end to permit light to enter said housing via said lens, said encapsulate material being chemically bonded about said electrical cable, wherein said encapsulate material fills all voids within said housing and said camera body is suspended in said encapsulate material and sealed against exposure to ambient conditions.

2. The assembly according to claim 1 wherein said encapsulate material and said camera body are chemically bonded.

3. The assembly according to claim 1 further comprising a transparent protective lens cover secured to said lens, wherein said lens cover is recessed in said viewing opening in said housing and is chemically bonded about its periphery to said encapsulate material.

4. The assembly according to claim 3 wherein said electrical cable extends rearwardly from said housing and is chemically bonded to said encapsulate material.

5. The assembly according to claim 4 further comprising at least one auxiliary recess defined in said housing and at least one light source disposed in said auxiliary recess with a portion of said light source supported by and chemically bonded to said encapsulate material, said light source having a plurality of electrical terminals embedded in said encapsulate material, and further including electrical wiring connected to said terminals and embedded in said encapsulate material.

6. The assembly according to claim 5 further comprising a pushrod secured to the rearward end of said camera body and projecting rearwardly from said housing, part of said pushrod being embedded in and chemically bonded to said encapsulate material.

7. The assembly according to claim 4 further comprising a plurality of auxiliary recesses defined in said housing in a substantially annular pattern about said viewing opening, each auxiliary recess having a respective light source disposed therein with a portion of the light source supported by and chemically bonded to said encapsulate material, each light source having a plurality of electrical terminals embedded in said encapsulate material, and further including electrical wiring connected to said terminals and embedded in said encapsulate material.

8. The assembly according to claim 1 further comprising a plurality of auxiliary recesses defined in said housing in a substantially annular pattern about said viewing opening, each auxiliary recess having a respective light source disposed therein with a portion of the light source supported by and chemically bonded to said encapsulate material, each light source having a plurality of electrical terminals embedded in said encapsulate material, and further including electrical wiring connected to said terminals and embedded in said encapsulate material.

9. A method for fabricating an encapsulated television camera assembly comprising the steps of:
   (a) supporting a television camera in a mold base with a transparent protective lens cover abutting a pedestal projecting from the interior surface of the mold base;

(b) enclosing the television camera in a mold assembly that includes said mold base and has only one opening communicating between the mold assembly interior and the ambient environment;

(c) flowing encapsulate material into said mold assembly to fill all voids therein while embedding the television camera in the encapsulate material, whereby the abutting relation between the pedestal and the lens cover prevents flow of encapsulate material therebetween; and (d) hardening the encapsulate material within the mold assembly to form a solid housing of encapsulate material chemically bonded to parts of the camera and in which the camera is embedded, wherein the housing has a lens opening defined by the abutting relation between the pedestal and the lens cover.

10. The method according to claim 9 wherein said camera assembly has an electrical cable extending therefrom, and further comprising, as part of step (b), extending the cable out from said mold assembly through said only one opening, whereby the encapsulate material chemically bonds to a portion of said cable disposed within the mold assembly.

11. The method according to claim 9 wherein step (a) includes orienting said camera downwardly in said mold base to cause said lens cover to rest on said pedestal.

12. The method according to claim 11 wherein said only one opening in said mold assembly is defined in the top wall of the mold assembly, and wherein step (c) includes pouring the flowable encapsulate material into said mold assembly.

13. The method according to claim 12 wherein said camera includes a pushrod extending rearwardly therefrom and wherein step (a) includes the steps of:

(a.1) projecting said pushrod through said opening in the wall of said mold assembly; and (a.2) disposing said mold assembly in a mold fixture and engaging the pushrod with said fixture to positionally stabilize the camera in the mold assembly.

14. The method according to claim 13 wherein step (a.2) includes engaging said pushrod with a vertically disposed fixture rod capable of selective longitudinal displacement to vary the force with which the lens cover is urged against the pedestal.

15. The method according to claim 14 wherein said encapsulated television camera assembly has a self-contained illumination source, said method further comprising the step of:

(e) supporting at least one light source in a lamp retainer disposed in said mold base in spaced relation to said pedestal, said light source being supported by said retainer such that a rearward portion of the light source is exposed in the mold assembly to thereby cause the exposed portion to be embedded in the encapsulate material.

16. The method according to claim 15 wherein step (e) further includes connecting electrical wires between terminals of said light source and terminals of said camera, wherein said electrical wiring is embedded in the encapsulate material in said encapsulated television camera assembly.

17. The method according to claim 12 wherein the encapsulated camera assembly includes a plurality of light sources embedded in said encapsulate material in an annular pattern disposed about said lens opening, wherein said method further comprises the step of:

(e) supporting said plurality of light sources in respective lamp retainers disposed in said mold base in mutually spaced relation in an annular pattern spaced radially from said pedestal, each light source being supported by a respective retainer such that a rearward portion of the light source is exposed to the mold assembly interior to thereby cause the exposed light source portions to be embedded in and chemically bonded to the encapsulate material.

18. The method according to claim 17 wherein said step (e) further includes connecting electrical wires between terminals of said light sources and terminals of said camera, wherein said electrical wiring is embedded in the encapsulate material in said encapsulated television camera assembly.

19. The method according to claim 9 further comprising the steps of covering said lens cover with tape before step (a) to prevent encapsulate material from seeping between the pedestal and lens cover and adhering to the lens cover, and removing the tape from the lens cover after step (d).

20. A mold assembly for fabricating an encapsulation housing for a television camera assembly of the type having a self-contained source of illumination, said mold assembly comprising:

a mold base having a substantially cup-like configuration with a bottom interior surface from which a pedestal upwardly projects, said pedestal having a generally frusto-conical configuration with a flat circular top surface;

at least one lamp receiver projecting from said interior surface in spaced relation to said pedestal and configured to resiliently engage a forward portion of a light source in pressure sealed relation to prevent fluid from reaching the forward portion of the light source, the retainer being configured to expose a rearward portion of the light source; and at least one additional mold section adapted to engage said mold base to form a mold assembly having only a single opening at its top for permitting flowable plastic material to be poured into the mold assembly.

21. The assembly according to claim 8 wherein said light sources are spaced from one another and from said camera body, and wherein said light sources are fixedly positioned relative to one another and to said camera body by said encapsulate material.

22. The assembly according to claim 21 wherein said encapsulate material is chemically bonded to said camera body.

23. The assembly according to claim 7 wherein said light sources are spaced from one another and from said camera body, and wherein said light sources are fixedly positioned relative to one another and to said camera body by said encapsulate material.

24. The assembly according to claim 23 wherein said encapsulate material is chemically bonded to said camera body.

25. The assembly according to claim 5 wherein said light source is spaced from said camera body and fixedly positioned relative to said camera body by said encapsulate material.

26. The assembly according to claim 25 wherein said encapsulate material is chemically bonded to said camera body.

* * * * *